Figure 1:
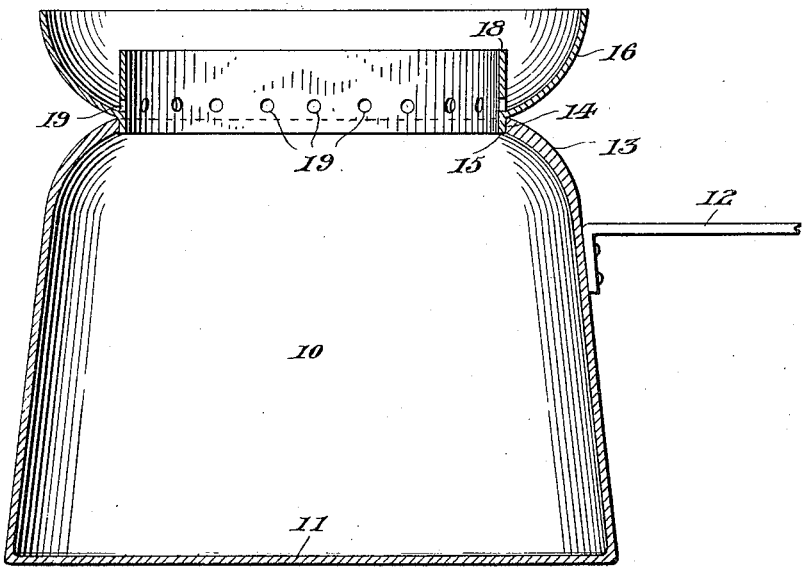

J. CIAPCIAK.
MILK BOILER.
APPLICATION FILED FEB. 14, 1919.

1,317,552.

Patented Sept. 30, 1919.

Inventor
J. Ciapciak

By R. Morgan Elliott
Attorneys

UNITED STATES PATENT OFFICE.

JOZEF CIAPCIAK, OF BUFFALO, NEW YORK.

MILK-BOILER.

1,317,552.

Specification of Letters Patent.   Patented Sept. 30, 1919.

Application filed February 14, 1919. Serial No. 276,996.

*To all whom it may concern:*

Be it known that I, JOZEF CIAPCIAK, a citizen of Poland, having declared my intention to become a citizen of the United States of America, residing at Buffalo, in the county of Erie and State of New York, have invented certain new and useful Improvements in Milk-Boilers, of which the following is a specification.

The primary object of the invention is the provision of a unitary device serviceable either as a cooker or a milk boiler, the structure possessing great simplicity and being easy and inexpensive to manufacture.

A further object of the invention is the provision of a culinary article preferably formed of such sheet metal as tin or aluminum, readily convertible for use as a cooker for vegetables and other edibles as well as a boiler for fluids such as milk.

With these general objects in view the invention will be hereinafter described in connection with the accompanying drawing in which like reference characters designate corresponding parts throughout the several views.

Figure 2:
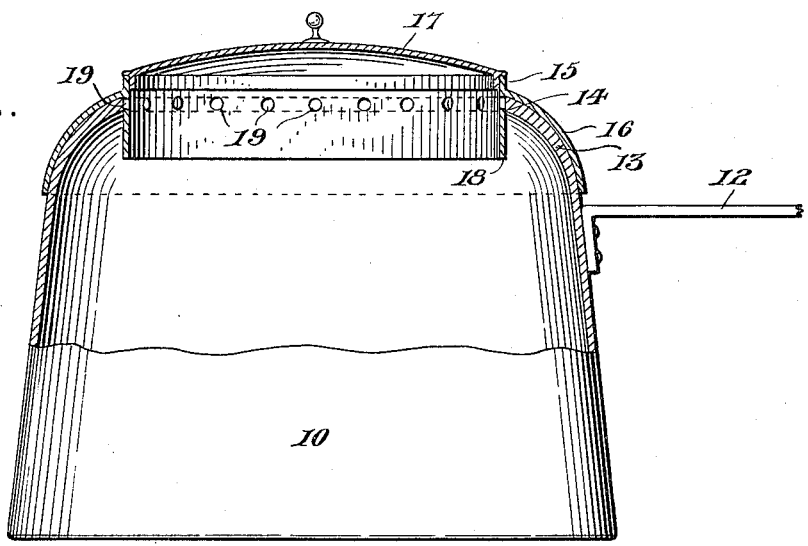
Figure 3:
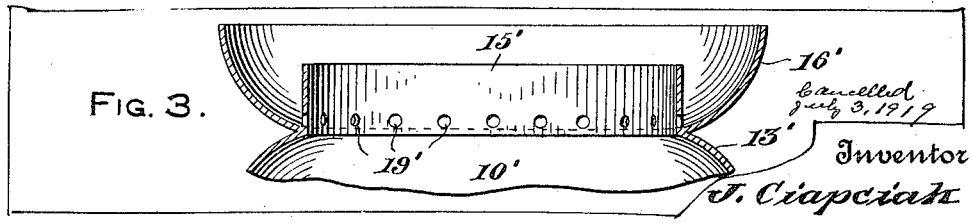

In the drawing,

Figure 1 is a central vertical sectional view through the invention arranged for use as a milk boiler, the handle broken away, and Fig. 2 is a similar view illustrating the invention employed as a cooker and partly shown in side elevation.

My invention provides a substantially usual form of pot or kettle 10 formed of metal with the bottom 11 thereof adapted for seating upon a stove or other suitable heater, a handle 12 projecting from the side of the pot.

The sides of the pot 10 are drawn inwardly upon arcuate lines at the top of the pot forming a rim 13 surrounding the circular open mouth or top opening 14 of the pot. A reversible extension 15 in the form of a sleeve is provided for ready reception within the mouth 14 while an arcuate flange 16 surrounds the said extension adapted to rest with its concaved face overlying the rim 13 when the extension 15 is positioned through the mouth 14 when the invention is desired for use as a cooker as illustrated in Fig. 2 of the drawing.

A lid or cover 17 is provided for the extension 15 for seating upon the top of the extension and closing the pot 10. The flange 16 is so positioned upon the extension 15 as to provide the major portion 18 of the extension within the flange 16, the portion 18 however being shorter than the flange 16 so that the latter entirely surrounds and projects above the extension 15 when the extension is reversed in its position upon the pot 10 for employment as a milk boiler as illustrated in Fig. 1.

The extension portion 18 is provided with a row of perforations 19 within the flange 16. These perforations 19 are serviceable when the invention is employed for boiling milk as the milk from the pot 10 will flow through and over the upper edge of the extension portion 18 and into the inverted flange 16 during the boiling of the milk while the milk will return through the perforations 19 to the pot 10 for reboiling.

When the invention is employed as a cooker as shown in Fig. 2, the perforations 19 will be closed by the inner edge of the rim 13 permitting the closing of the pot by the lid 17.

A serviceable milk boiler is provided which is easily converted into a cooking pot whenever desired, the entire structure being sanitary and easily disassembled for cleaning.

What I claim as new is:—

1. A device of the class described comprising a pot having an inwardly curved rim at the top thereof providing a restricted mouth for the pot, a tubular extension adapted for reversible positioning within said mouth, an annular imperforate flange surrounding said extension and having one edge rigidly connected to the extension between the ends of the latter, said flange extending outwardly and beyond one end of the extension and being curved to fit over the rim of the pot when the extension is in one position for employing the device as a cooker, said extension having perforations therethrough communicating with the interior of the flange and closed by the rim when the flange is fitted over said rim, said flange resting on the rim of the pot and projecting outwardly and upwardly when the extension is in its other position for employing the device as a milk boiler.

2. A device of the class described comprising a pot having an inwardly curved rim at the top thereof providing a restricted mouth for the pot, a tubular extension adapted for reversible positioning within said mouth, an annular imperforate flange surrounding said extension and having one edge rigidly connected to the extension between the ends of the latter, said flange extending outwardly and beyond one end of the extension and being curved to fit over the rim of the pot when the extension is in one position for employing the device as a cooker, said extension having perforations therethrough communicating with the interior of the flange and closed by the rim when the flange is fitted over said rim, said flange resting on the rim of the pot and projecting outwardly and upwardly when the extension is in its other position for employing the device as a milk boiler and a lid for closing the outer end of the extension when the latter is positioned for employing the device as a cooker.

In testimony whereof I affix my signature.

JOZEF CIAPCIAK.

Copies of this patent may be obtained for five cents each, by addressing the "Commissioner of Patents, Washington, D. C."